(No Model.)  
5 Sheets—Sheet 2.
J. C. BARBER.
CAR TRUCK.
No. 571,914.  
Patented Nov. 24, 1896.
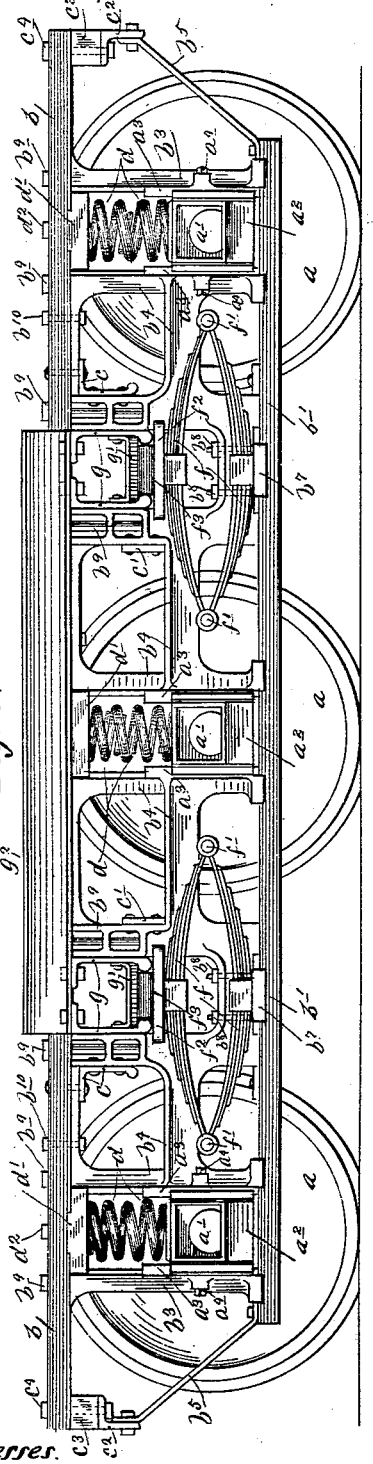
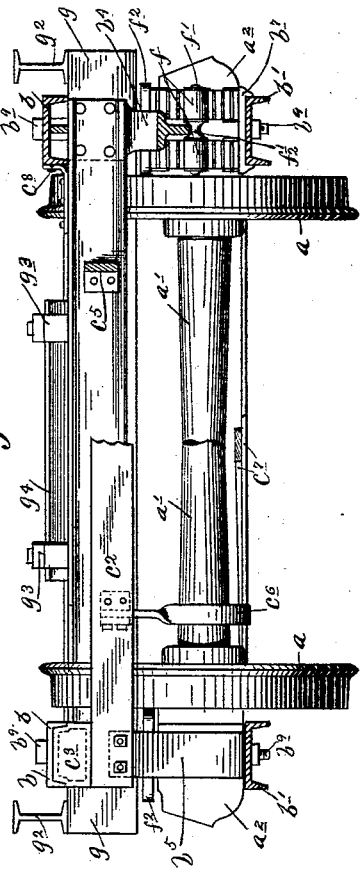
Witnesses.  
C. F. Kilgore  
D. D. Merchant
Inventor.  
John C. Barber.  
By his Attorney.  
Jas. F. Williamson (No Model.) 5 Sheets—Sheet 3.
J. C. BARBER.
CAR TRUCK.

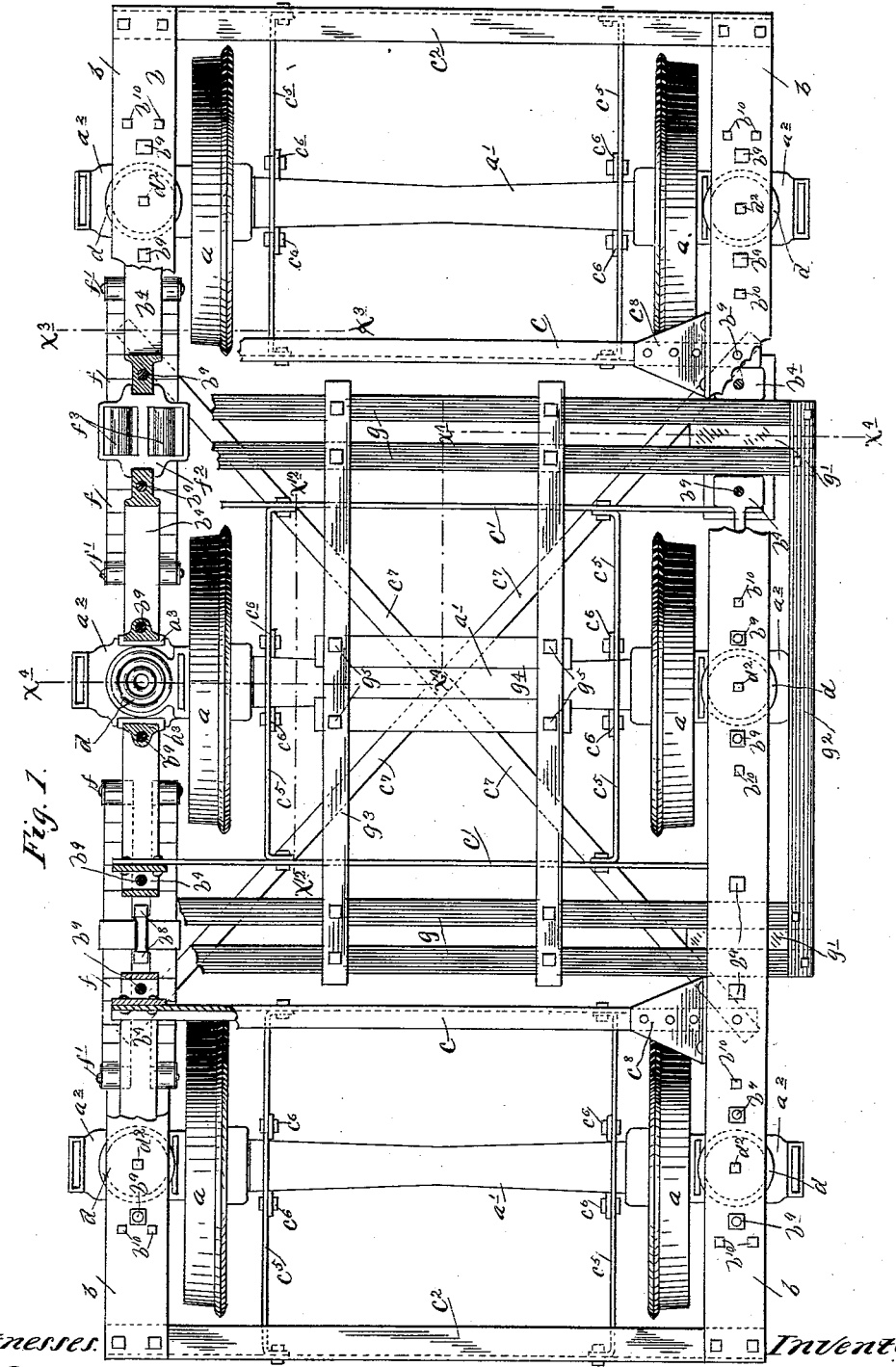

No. 571,914. Patented Nov. 24, 1896.

Witnesses.
C. F. Kiegon
S. D. Merchant.

Inventor.
John C. Barber.
By his Attorney,
Jas. F. Williamson.

THE NORRIS PETERS CO., PHOTO-LITHO., WASHINGTON, D. C.

(No Model.) 5 Sheets—Sheet 4.
J. C. BARBER.
CAR TRUCK.
No. 571,914. Patented Nov. 24, 1896.
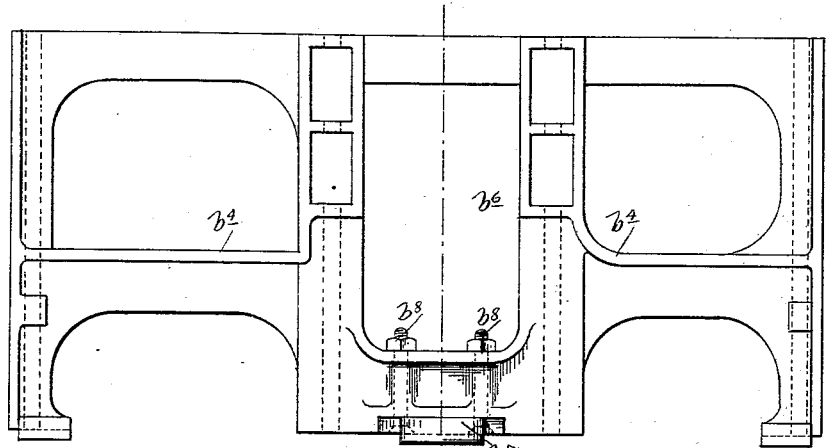
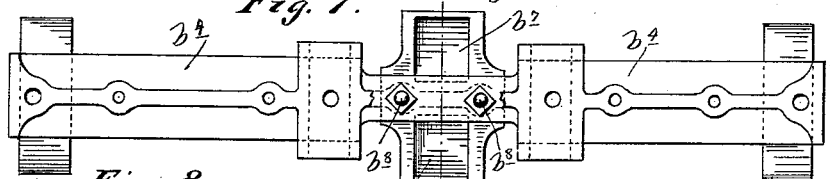
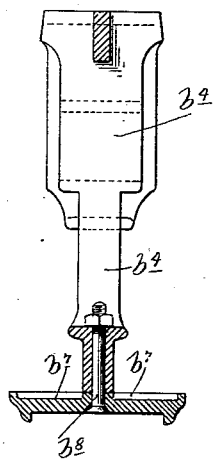
Witnesses.
C. F. Kleyn
R. D. Merchant.
Inventor:
John C. Barber.
By his Attorney.
Jas. F. Williamson (No Model.) 5 Sheets—Sheet 5.
J. C. BARBER.
CAR TRUCK.
No. 571,914. Patented Nov. 24, 1896.
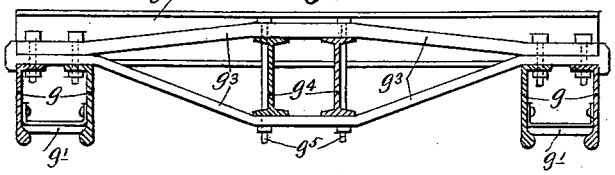
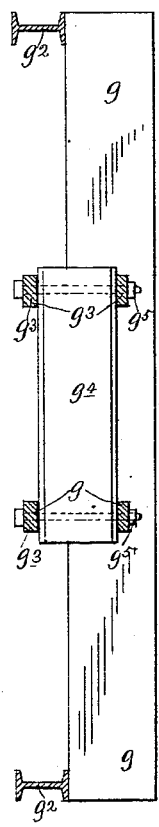
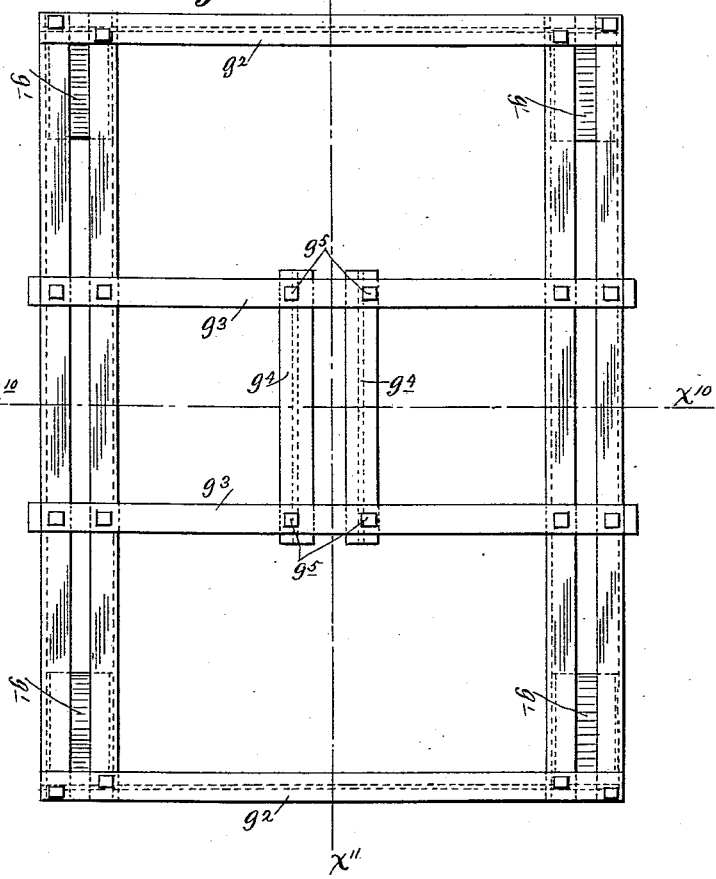
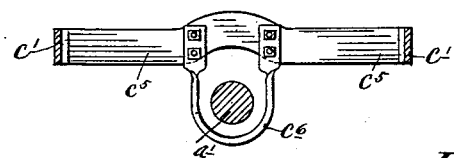
Witnesses.
C. F. Kiefer
R. D. Merchant
Inventor.
John C. Barber.
By his Attorney.
Jas. F. Williamson.

UNITED STATES PATENT OFFICE.

JOHN C. BARBER, OF ST. PAUL, MINNESOTA.

CAR-TRUCK.

SPECIFICATION forming part of Letters Patent No. 571,914, dated November 24, 1896.

Application filed February 27, 1896. Serial No. 580,942. (No model.)

*To all whom it may concern:*

Be it known that I, JOHN C. BARBER, a citizen of the United States, residing at St. Paul, in the county of Ramsey and State of Minnesota, have invented certain new and useful Improvements in Car-Trucks; and I do hereby declare the following to be a full, clear, and exact description of the invention, such as will enable others skilled in the art to which it appertains to make and use the same.

My invention relates to car-trucks, and is especially designed as an improvement in six-wheel or passenger trucks, with a view of decreased initial cost, increased strength, and greater durability under the service.

To these ends my invention comprises the novel devices and combinations of devices hereinafter described, and defined in the claims.

The truck herein disclosed, in addition to my present invention, involves, in a broad point of view, certain features of construction disclosed and claimed in my prior United States Patents, No. 506,460, of date October 10, 1893, and No. 528,844, of date November 6, 1894, and in my pending applications, Serial No. 751,851, filed December 12, 1895, and Serial No. 572,857, filed December 21, 1895.

My invention in its preferred form is illustrated in the accompanying drawings, wherein, like notations referring to like parts throughout the several views—

Figure 4:
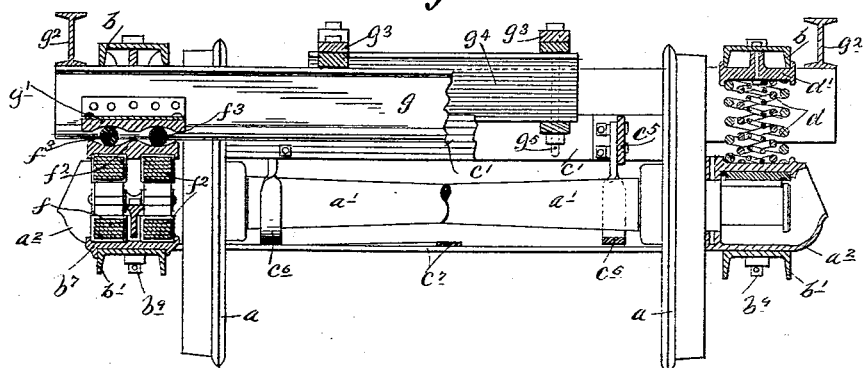
Figure 5:
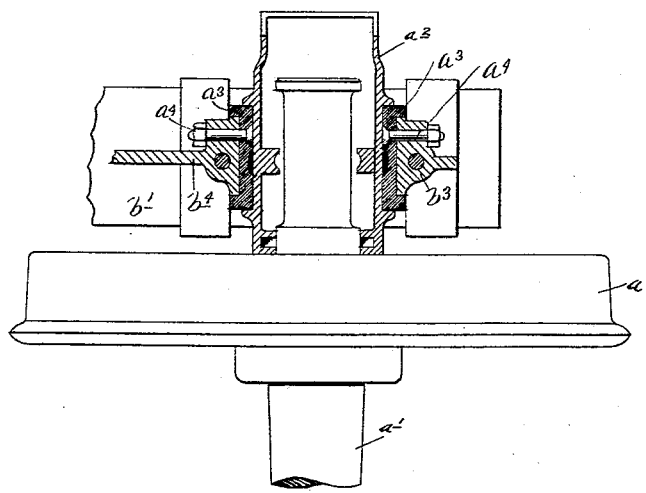

Figure 1 is a plan view of my improved truck with some parts broken away and others shown in horizontal section. Fig. 2 is a side elevation of the same. Fig. 3 is a view, partly in right end elevation with respect to Fig. 1 and partly in vertical section, on the line $x^3 x^3$ of Fig. 1. Fig. 4 is a vertical section on the irregular line $x^4 x^4$ of Fig. 1, looking from the right. Fig. 5 is a detail, partly in plan and partly in horizontal section, through one of the journal-boxes and its guides. Fig. 6 is a detail in side elevation showing one of the body panels or castings of the side frames detached. Fig. 7 is a plan view of the same with some parts broken away. Fig. 8 is a vertical section on the line $x^8 x^8$ of Figs. 6 and 7. Fig. 9 is a plan view of the bolster-platform detached. Fig. 10 is a vertical section on the line $x^{10} x^{10}$ of Fig. 9. Fig. 11 is a vertical section on the line $x^{11} x^{11}$ of Fig. 9; and Fig. 12 is a detail in section on the line $x^{12} x^{12}$ of Fig. 1, looking outward and with some of the parts removed.

$a$ $a'$ $a^2$ represent, respectively, the wheels, the axles, and the journal-boxes of the truck.

The side frames are made up of upper and lower longitudinal tie-bars $b$ $b'$ of channel form in cross-section, end pedestals $b^3$, a pair of symmetrical or similar body panels $b^4$, and end braces $b^5$. The panels $b^4$ are preferably made of cast metal and are provided with suitable bolster-seats $b^6$ and suitable spring-seats $b^7$, the base-plates of which spring-seats are removably secured to the body portion of the panel-casting $b^4$ by nutted bolts $b^8$, for a purpose which will presently more fully appear.

The pedestals $b^3$ and the body-panels $b^4$ are embraced by the upper and lower tie-bars $b$ $b'$ and are rigidly secured thereto by nutted bolts $b^9$ and $b^{10}$ or other suitable means. The said pedestals $b^3$ and the said body-panels $b^4$ are so disposed in respect to each other that the outer ends of the body-panels $b^4$ coöperate with the said pedestals $b^3$ to form the guides for the front and rear members of the journal-boxes $a^2$, and that the inner ends of the said panels $b^4$ coöperate with each other to form the guides for the central member of the journal-boxes. The end braces $b^5$ are connected below to the lower tie-bar $b'$ directly, and connected above to the upper tie-bar $b$ indirectly. The nutted bolts $b^9$ pass through the panel-castings or the pedestals $b^3$, as the case may be, and through both the upper and lower tie-bars $b$ $b'$.

The two side frames are connected with each other above the levels of the truck-axles by transoms $c$ $c'$ and end cross-ties $c^2$. The end cross-ties $c^2$ are connected to the top tie-bars $b$ of the side frames by caps or filling-blocks $c^3$ and nutted bolts $c^4$. The end braces $b^5$ of the side frames are bolted to the cross-ties $c^2$ at their upper ends. The respective end cross-ties $c^2$ are connected with the respective transoms $c$ by longitudinal brace-bars $c^5$, which span the axles and are provided with yoke-like safety-hangers $c^6$ embracing the axles. The central transoms $c'$ are connected in the same way by corresponding longitudinal brace-bars $c^5$ with similar hangers $c^6$, embracing the central axle.

The side frames are also connected below the level of the truck-axles by means of diagonal brace-bars $c^7$, which cross each other and are rigidly connected by bolts or rivets to the lower tie-bars $b'$ of the side frames. Angle-iron braces $c^8$ reinforce the joints between the side frames and the transoms $c$.

With the construction above described it is obvious that a strong and rigid truck-frame is afforded, which is braced or trussed in every direction. The upper and lower tie-bars $b$ $b'$ of the side frames are of channel-iron, the transoms $c$ and the end cross-ties $c^2$ are of angle-iron, and the transoms $c'$, together with the diagonal braces $c^7$, are shown as in the form of plain bars. Otherwise stated, the pedestals $b^3$ and the body-panels $b^4$ of the side frames are preferably made in the form of castings, and all the other parts which are applied to bind together said castings and brace the same in every direction are made up of rolled forms of steel or wrought-iron. Hence a truck-frame is obtained of very great strength and rigidity in proportion to the mass or weight of metal employed. The journal-box guides are preferably provided with wearing-blocks $a^3$, which are removably secured to the rigid guides by nutted bolts $a^4$, as shown in Fig. 5.

Over the journal-boxes are placed spiral springs $d$, which react against the said boxes and spring-caps $d'$, removably secured to the top tie-bars $b$ of the side frames by nutted bolts $d^2$. The said springs $d$ are of the triple-coil variety and serve to cushion the "chop" from the axles.

The main springs $f$ are of the elliptic form and are arranged in pairs lengthwise of the side frames on the base-plates of the spring-seats $b^7$, with one member on each side of the vertical web of the body-panels $b^4$ and connected by their common hinge-bolts $f'$, which work through openings in said panels and are provided with spacing-spools $f^{1/2}$, separating the ends of the two springs.

In virtue of the removable spring base-plate $b^7$ the said main or elliptical springs $f$ may be applied to the side frames in advance of the lower tie-bars $b'$, which is a great convenience, and when all the parts are in their working positions it is only necessary to take down the lower tie-bars $b'$ and the base-plates $b^7$ in order to remove the springs $f$ downward. The base-plates $b^7$ are of the proper form to be engaged by the lower tie-bars $b'$ when the latter are in working position, so that the strain from the springs will be taken jointly by said bolts $b^8$ and tie-bars $b'$.

Flanged spring-caps $f^2$ embrace the upper bosses of the pairs of springs $f$ and embrace the side walls or columns of the bolster-seats $b^6$ as guides. The said caps $f^2$ have faces of the proper form to serve as seats for the roller-bearings $f^3$.

The bolsters proper are made up of pairs of bulb angle-bars $g$, united and spaced apart at their ends by the bearing-plates $g'$, which rest on the rollers $f^3$. The said angle-bars $g$ are bolted or riveted above to longitudinal bridge-bars $g^2$ $g^3$, connecting the two bolsters, of which parts $g^2$ are I-shaped bars resting on the outer ends of the two bolsters and the parts $g^3$ are double flat bar trusses resting on the two bolsters, on opposite sides of the centers of the same. The truss-bars $g^3$ embrace a pair of I-shaped bars $g^4$, located parallel with the bolsters on opposite sides of the truck center for supporting the center plate. (Not shown.) The said parts $g^3$ $g^4$ are connected by nutted tie-bolts $g^5$. The said bolsters, bridge-bars, and center-plate supports being all rigidly connected, as above described, make up what may conveniently be called the "bolster-platform," supported from the four pairs of main springs $f$ with the bolsters working in the seats $b^6$ of the body-panels $b^4$, underneath the top ribs thereof and the upper tie-bars $b$ applied thereto. Inasmuch as the bolsters proper thus extend outward through the bolster seats or passages $b^6$ in the body-panels $b^4$ and have the outer end bridge-bars $g^2$ applied thereto, as described, the bolster-platform is interlocked with the side frames of the truck, while, at the same time, it is free for the limited lateral motion required on its roller-bearings $f^3$.

The vertical walls of the bolster-seats $b^6$ in the body-panels $b^4$ of the side frames serve as the bolster-columns to take the forward-and-backward thrust of the bolsters.

All the parts of my improved six-wheel or passenger truck have now been specified, and from the description of the same it must be obvious that the construction is simple and inexpensive compared with the constructions hitherto used; that the truck-frame is one of great rigidity and strength in proportion to mass or weight; that the bolster platform and springs are supported in such a way as to afford increased convenience and security; that the load from the car-body on the bolster-platform will be taken by the main springs and side frames in the direct line of the journal-bearings, thereby avoiding any tendency to laterally tilt the side frames on the axle-journals, and that the load will be equally distributed on all the axles and wheels.

It must be understood that I do not limit myself to the cast form of the body-panels $b^4$ of the side frames, for they might be stamped up or pressed out of sheet-steel. Nor do I, in the broad point of view, limit myself to the use of such panels for six-wheel or passenger trucks, for such panels might be used for the side frames of four-wheeled trucks, in which case the ends of a single panel would coöperate with the end pedestals to form the journal-box guides.

It will also be understood that other or minor changes might be made in many of the details of the construction shown without departing from the spirit of my invention.

What I claim, and desire to secure by Letters Patent of the United States, is as follows:

1. A side frame for car-trucks comprising upper and lower longitudinal tie-bars, end pedestals, and one or more body-panels having bolster and spring seats, with said pedestals and body panel or panels embraced by said tie-bars and rigidly connected thereto and so disposed that the outer ends of the panel or panels coöperate with the pedestals to form journal-box guides, substantially as described.

2. A side frame for six-wheel car-trucks, comprising upper and lower tie-bars, a pair of end pedestals and a pair of body-panels having bolster and spring seats, with said pedestals and body-panels embraced by said tie-bars and rigidly connected thereto and with all of said parts so disposed that the outer ends of said body-panels coöperate with said pedestals to form the front and rear journal-box guides and that the inner ends of the said body-panels coöperate to form the guides for the central journal-box, substantially as described.

3. A side frame for six-wheel car-trucks, comprising upper and lower tie-bars, a pair of end pedestal castings and a pair of panel-like body-castings having bolster and spring seats, with all of said castings embraced by and rigidly connected to said tie-bars and so disposed that the outer ends of the body-castings coöperate with the pedestal castings to form the guides for the front and rear journal-boxes and that the inner ends of the body-castings coöperate to form the guides for the central journal-box, substantially as described.

4. The six-wheel car-truck frame, comprising the combination with the pair of side frames each composed of the upper and lower longitudinal tie-bars connected by end braces, end pedestals, and body-panels having bolster and spring seats, with the pedestals and panels embraced by the tie-bars and rigidly connected thereto and with all of said parts so disposed that the outer ends of the panels coöperate with the pedestals to form the guides for the front and rear journal-boxes and the inner ends of the panels coöperate with each other to form the guides for the central journal-box, transoms and end cross-ties connecting said side frames, above the level of the truck-axles, and diagonal crossed braces connecting said side frames, below the level of the truck-axles, substantially as described.

5. In a car-truck, the combination with side frames having underrunning or lower tie-bars, coöperating to brace and hold the parts in position, of spring base-plates adjustably securable to the bodies of the side frames and adapted to be upheld by said lower tie-bars, whereby the springs may be applied in advance of said lower tie-bar and be removed by simply removing the said tie-bars and spring base-plates, substantially as described.

6. In a car-truck, the combination with side frames composed of upper and lower tie-bars and one or more body-panels embraced by and rigidly connected to said tie-bars, of spring base-plates adjustably secured to the panels and adapted to be upheld by the lower tie-bar, when applied, whereby the springs may be applied in advance of the lower tie-bar and may be removed by simply taking off the lower tie-bar and spring base-plates, substantially as described.

7. In a six-wheel car-truck, the combination with the side frames composed of upper and lower tie-bars, end pedestals and body-panels having bolster and spring seats, with the base-plates for the main springs extending laterally on opposite sides of the vertical panel-webs, and pairs of elliptic springs applied to each of said seats, lengthwise of the side frame, resting on said spring base-plates, with one on each side of the panel-web, substantially as described.

8. In a six-wheel car-truck, the combination with side frames having spring and bolster seats, and a bolster-platform, comprising the pair of bolsters working in said seats and resting on said springs, the I-shaped bars connecting the ends of said two bolsters, the pair of double truss-bars connecting said bolsters near to but on the opposite sides of their centers, and the pair of I-shaped bars parallel with the bolsters and midway between the same, embraced and held by said truss-bars, all substantially as and for the purpose set forth.

In testimony whereof I affix my signature in presence of two witnesses.

JOHN C. BARBER.

Witnesses:
E. F. ELMORE,
JAS. F. WILLIAMSON.